United States Patent Office 3,265,743
Patented August 9, 1966

3,265,743
PRODUCTION OF DIHALOCARBENE ADDUCTS
Gene C. Robinson, Baton Rouge, La., assignor to Ethyl Corporation, New York, N.Y., a corporation of Virginia
No Drawing. Filed May 14, 1962, Ser. No. 194,667
15 Claims. (Cl. 260—648)

The present invention relates to a novel process involving the generation of dihalocarbene and the proximate formation of dihalocarbene adducts.

The prior art discloses several methods for the generation of dihalocarbene and the formation of dihalocarbene adducts, for example, the reaction of metallic potassium and tertiary butyl alcohol followed by the reaction with chloroform in the presence of cyclohexene. Although the reported yield of dichloronorcarane is quite good—59 percent—this procedure requires the use of expensive reagents. Another method comprises reacting potassium hydroxide and chloroform in an aqueous medium and in the presence of cyclohexene. The reported yield of dichloronorcarane was 0.55 percent. For further discussion see "The Addition of Dichlorocarbene to Olefins" by Doering and Hoffman, Journal of the American Chemical Society, vol. 76, 1954, page 6162 et seq.

An examination of the prior art will disclose that the previously known processes are generally characterized by low yields or the use of expensive reagents. Accordingly, it is an object of this invention to provide the art with a novel process involving the generation of dihalocarbene which is attractive both from the standpoint of yields obtained and process economics.

This object is accomplished by reacting together a mixture comprising an alkali metal hydroxide, a haloform, and a dihalocarbene acceptor. The aforesaid reagents, as initially charged into the reaction zone are to be essentially anhydrous. In other words, an aqueous solvent is not employed in the present process, and more importantly, the reaction system is essentially anhydrous at the outset. This latter feature appears to enable the reaction to commence. Once the reaction has started, the halocarbene produced appears to react so quickly with the halocarbene acceptor which is co-present that it is unnecessary to remove the by-product water from the reaction scene.

The yields of the desired adducts produced pursuant to this invention have reached as high as 45 percent. Furthermore, these good yields are achieved utilizing cheap and readily available reactants. It is interesting to compare these results with the 0.55 percent yield reported by Doering and Hoffman who attempted to make use of potassium hydroxide as a basic reagent.

The alkali metal hydroxides to be employed in this process are lithium hydroxide, sodium hydroxide, potassium hydroxide, rubidium hydroxide and cesium hydroxide. These alkali metal hydroxides may be employed individually or in admixture. The preferable hydroxides for this reaction are sodium hydroxide and potassium hydroxide. With regard both to reactivity and cost effectiveness the use of sodium hydroxide is a particularly preferred embodiment of this invention.

When carrying out the process of this invention it is necessary to employ initially essentially anhydrous reagents. A distinctly preferred embodiment of this invention is to employ a means to minimize the effect of water which may initially be present as a trace impurity in the reagents and also the water which is generated by the reaction itself. A wide variety of methods may be employed to effect this result. An excellent method is to add an excess of the alkali metal hydroxide to the reaction system in order to reduce the effect of water concentration. Of course, when desired, other desiccants which are inert to the reaction mass may be added thereto, e.g., silica gel, asbestos, charcoal, and the like. Another desirable method is reflux drying which is accomplished either by gravimetric entrapment of the water in the reflux return or by bringing the reflux vapors into contact with a desiccant or both. Materials which may be used to dry the reflux are phosphorus pentoxide, magnesium perchlorate, alkali and alkaline earth metal hydroxides, aluminum oxide, sulfuric acid, magnesium oxide, beryllium perchlorate, calcium oxide, calcium bromide, calcium chloride, zinc chloride, zinc bromide, copper sulfate, silica gel, charcoal, asbestos, and the like. Another suitable method is to add an inert solvent such as hexane, cyclooctane, petroleum ether, and the like and to strip off the azeotropic water-solvent mixture. Excellent results are achieved when both reflux drying and an in situ desiccant is employed. A preferred embodiment of this invention both from the standpoint of simplicity and economics comprises the use of an excess of the metal hydroxide reagent as the in situ desiccant.

The metal hydroxide reagent may be employed in stoichiometric quantities, i.e., a molar ratio of hydroxide to haloform of 1:1, however it is preferred that an excess be used due both to the desirability of decreasing the effective concentration of water generated by the reaction and to insure the efficient consumption of the haloform. An effective ratio of the hydroxide to the haloform has been found to be within the range of from about 1.5:1 to about 5:1. A particularly effective ratio has been found to be from about 2:1 to about 4:1.

It is preferred, though not required, that the metal hydroxide be employed in finely divided form (i.e., the average particle size should range from about 50 to about 500 microns). This can be accomplished in situ by high speed stirring or the hydroxide as initially charged can be finely divided.

The haloforms which are to be used in this reaction are those having at least 1 atom of chlorine or bromine. Examples of these haloforms are chloroform, bromoform, dichlorobromoform, dibromochloroform, difluorochloroform, dibromochloroform, dichlorofluoroform, dibromofluoroform, diiodochloroform, dichloroiodoform, diiodobromoform, chlorobromoiodoform, fluorochloroiodoform, fluorobromoiodoform, and the like. The various haloforms mentioned above may be used individually or in admixture in this process, however, particularly from the commercial standpoint, chloroform and bromoform are preferred. The use of chloroform in all respects is very advantageous.

Due to the highly reactive nature of dihalocarbene it is desirable to react it proximately as formed with a material with which it is capable of forming an adduct. This is preferably accomplished in situ, i.e., charging the reactor initially with a dihalocarbene acceptor. The dihalocarbene acceptors cover a very wide range of chemical compounds and generally will comprise organic compounds having up to 25 carbon atoms containing the aliphatic double bond, the aromatic double bond in a condensed ring nucleus, the carbon to carbon triple bond, the carbon to nitrogen double bond, the carbon to nitrogen triple bond, and polymers having a multiple bond as part of the repeating unit. The following are exemplary of compounds capable of forming an adduct with dihalocarbene.

Ethylene, propylene, butene-1, cis-butene-2, trans-butene-2, isobutylene, diisobutylene, propylene trimer, propylene tetramer, cyclohexene, cyclooctene, cyclopentene, cyclooctadiene-1,5, cyclooctadiene-1,3, bicycloheptene, bicycloheptadiene, anethol, butadiene, isoprene, chloroprene, camphene, styrene, divinylbenzene, α-methylstyrene, propylbenzene, allylbenzene, biallyl, dicyclopentadiene, cyclopentadiene, methylcyclopentadiene, methylcyclopentadiene dimer, dihydropyran, dipentene, vinyl chloride, triisobutylene, vinyl butyl ether, vinyl ethyl ether, vinylidene chloride, α-pinene, β-pinene, tetramethylethylene, 2,5-dihydrofuran, diallylether, 4-methylpentene-1, pentene-1, pentene-2, 2-methylbutene-1, 2-methylbutene-2, 3-methylpentene-1, 3-methylpentene-2, hexene-1, hexene-2, octene-1, octene-2, octene-3, decene-1, dodecene-1, tetradecene-1, octadecene-1, hexadecene-1, cholestene, 4-vinylcyclohexene-1, acrolein diethyl acetal, 2-ethylhexene-1, indene, stilbene, dimethyl ketene acetal, diethyl ketene acetal, vinylacetylene, 1-ethyl-1-butylethylene, glycerol triallyl ether, glycerol trivinyl ether, 1,5,9-cyclododecatriene, cyclooctatetraene.

Anthracene, 1-methoxynaphthalene, 2-methoxynaphthalene, 9-methoxyphenanthrene, phenanthrene, acenaphthylene.

Methyl amine, ethyl amine, propyl amine, allyl amine, ethanolamine, aniline, p-toluidine, m-toluidine, o-toluidine, α-naphthyl amine, β-naphthyl amine, p-anisidine, cyclohexylamine.

Benzalaniline, benzalazine, diethylcarbodiimide.

Acetylene, methylacetylene, hexyne-3, butyne-1, butyne-2, phenylacetylene, cyclodecyne, diphenylacetylene.

Oleic acid, undecylenic acid, crotonic acid, cinnamic acid, methyl vinyl ketone, mesityl oxide, acrylic acid, methacrylic acid, acrylonitrile, benzalacetone, dibenzalacetone.

Allyl alcohol, crotyl alcohol, methyl vinyl carbinol, cinnamyl alcohol, 3-butene-1-ol.

The nature and identity of a wide variety of dihalocarbene acceptors are known in the art. For instance, reference may be had to Journal of the American Chemical Society, vol. 76, page 6162 (1954), vol. 81, page 2579 (1959), vol. 83, page 603 (1961), vol. 82, page 4085 (1960).

Equimolar amounts of the dihalocarbene acceptor and the haloform may be employed, however it is usually desirable to employ an excess of the acceptor. Generally, good results will be obtained when the ratio of acceptor to dihalocarbene is within the range of from about 1.5:1 to about 10:1. An excellent operating ratio is within the range of from 2:1 to about 5:1.

This process may be conducted at atmospheric pressure in an open vessel or at autogenous pressure in a closed vessel. When the dihalocarbene acceptor is a gas under the reaction conditions pressure will generally be required. The exact temperature for this process depends, of course, on the particular reagents used, generally however good results will be obtained when the temperature is within the range of from about 0° C. to about 250° C. A recommended operating temperature range is from about 20° C. to about 110° C. The reaction will be complete in from about 10 hours to about 30 hours depending on the process conditions. Usually a reaction time of from about 10 to about 14 hours is sufficient.

This process can be carried out with or without an inert solvent, however the preferred embodiment is without a solvent. When a solvent is used care must be taken to select one which is inert to the reaction mixture. It is very important to avoid solvents which have a substantial degree of unsaturation (unless, of course, the solvent is an excess of the selected dihalocarbene acceptor) and also either water itself or otherwise inert solvents which are cut with substantial amounts of water due to the fact that the presence of water at the start of the reaction drastically reduces the yields of the desired adducts. Recommended solvents are essentially anhydrous saturated hydrocarbons which are liquid under the reaction conditions such as hexanes, heptanes, octanes, decanes, dodecanes, pentadecanes, octadecanes, eicosanes, cyclohexanes, cyclooctanes, petroleum ether, petroleum spirit, kerosene, and the like.

In order that those skilled in the art may better understand the process of this invention the following examples are given.

*Example I*

Into a dry 300 milliliter, two-necked flask fitted with a stirrer and a water trap was charged 0.5 mole of sodium hydroxide in commercially available pellet form, 1.0 mole of cyclohexene, and 0.38 mole of chloroform. The aforesaid reagents were anhydrous as initially charged into the reaction vessel. The mixture was heated at 90° C. under a nitrogen blanket while slowly stirring the reaction mixture. During the reaction, the sodium hydroxide pellets were not pulverized. Some of the water generated by the reaction was collected in the water trap. The reaction was complete in about 14 hours. The product was analyzed and proved to be the dichlorocarbene adduct of cyclohexene, i.e., dichloronorcarane. The yield of dichloronorcarane was 24 percent.

*Example II*

Into a dry 300 milliliter reaction vessel equipped with a stirrer was charged 0.5 mole of sodium hydroxide in commercially available pellet form, 0.5 mole of chloroform, and 1.0 mole of cyclohexene. These reagents were initially anhydrous. Equimolar amounts of sodium hydroxide and chloroform having been added, the sodium hydroxide was consumed by the reaction. During the reaction the pellets were not pulverized. The water generated by the reaction was allowed to remain in the reaction vessel and due to the fact that no excess of sodium hydroxide had been charged, the mixture became increasingly aqueous as the reaction proceeded. The reaction proceeded at 95° C. for 10 hours while slowly stirring. The yield of dichloronorcarane was 27 percent.

*Example III*

Into the reaction vessel described in Example II was charged 1.5 mole of sodium hydroxide in commercially available pellet form, 1.4 mole of chloroform, and 3.0 mole of cyclohexene. The reagents were initially anhydrous. The mixture was heated at 90° C. for 12 hours while slowly stirring. The sodium hydroxide remained substantially in pellet form until consumed. The water generated by the reaction was allowed to remain in the reaction vessel resulting in a substantially aqueous mixture near the end of the run. The yield of dichloronorcarane was 24 percent.

*Example IV*

Into a dry 300 milliliter reaction vessel equipped with a high speed stirrer was charged 1.00 mole of sodium hydroxide in commercially available pellet form, 0.25 mole of chloroform, and 0.25 mole of cyclohexene. The reactants were anhydrous initially and the sodium hydroxide was charged in sufficient excess to minimize the effect of the water generated by the reaction. The reaction continued for 30 hours at 30° C. accompanied by high speed stirring which served to pulverize the sodium hydroxide pellets. The yield of dichloronorcarane was 45 percent.

*Example V*

Into a dry 300 milliliter reaction vessel equipped with a high speed stirrer was charged 0.8 mole of potassium hydroxide in commercially available pellet form, 0.25 mole of chloroform, 0.60 mole of cyclohexene. The reagents were anhydrous as charged into the reaction vessel. The reaction proceeded for 28 hours at 30° C. accompanied by high speed stirring which pulverized the potassium hydroxide pellets. Sufficient potassium hydroxide was charged to minimize the effect of the water generated by the reaction. The yield of dichloronorcarane was 14 percent.

Example VI

Into a dry 100 milliliter three-necked flask fitted with a stirrer was charged 0.125 mole of sodium hydroxide in commercially available pellet form, 0.125 mole of chloroform and 0.39 mole of cyclooctene. The reactants as initially charged were anhydrous. The mixture was heated for 10 hours at 90° C. with slow stirring. The sodium hydroxide remained in substantially pellet form until consumed. The mixture became increasingly aqueous as the reaction proceeded. A 20 percent yield of 9,9-dichlorobicyclo(6,1,0,)nonane was obtained.

What I claim as new and desire to secure by Letters Patent of the United States is as follows:

1. A process involving the generation of dihalocarbene and the proximate formation of dihalocarbene adducts which comprises the step of reacting together an initially essentially anhydrous mixture with the reactants consisting essentially of a solid alkali metal hydroxide, a haloform, and a dihalocarbene acceptor, said haloform containing at least one halogen atom selected from the group consisting of chlorine and bromine.

2. The process of claim 1 wherein said haloform is chloroform.

3. The process of claim 1 wherein said haloform is bromoform.

4. The process of claim 1 wherein said metal hydroxide is sodium hydroxide.

5. The process of claim 1 wherein said metal hydroxide is potassium hydroxide.

6. The process of claim 1 wherein said haloform is chloroform and said metal hydroxide is sodium hydroxide.

7. A process involving the generation of dihalocarbene and the proximate formation of a dihalocarbene adduct which comprises the step of reacting together at a temperature within the range of about 0° C. to about 250° C. an initially essentially anhydrous mixture, the reactants consisting essentially of a solid alkali metal hydroxide, a haloform, and a dihalocarbene acceptor, said haloform containing at least one halogen atom selected from the group consisting of chlorine and bromine; and wherein the effect of water generated by the reaction is minimized by charging the reactor with a molar excess of said alkali metal hydroxide over the moles of haloform employed, the molar ratio of alkali metal hydroxide to haloform thus being greater than 1:1.

8. The process of claim 1 wherein the effect of water generated by the reaction is minimized by charging the reactor with a molar excess of said alkali metal hydroxide over the moles of haloform employed, the molar ratio of alkali metal hydroxide to haloform thus being greater than 1:1.

9. The process of claim 1 conducted at a temperature within the range of from about 20° C. to about 110° C.

10. The process of claim 1 wherein said dihalocarbene acceptor contains at least one aliphatic carbon-to-carbon double bond.

11. The process of claim 1 wherein the molar ratio of alkali metal hydroxide to haloform is within the range of from about 1.5:1 to about 5:1.

12. A process for the preparation of dihalocarbene adducts which comprises effecting a reaction between finely divided sodium hydroxide and chloroform at a temperature in the range of from about 20° C. to about 110° C. in an initially essentially anhydrous reaction medium containing a dihalocarbene acceptor, the molar ratio of sodium hydroxide to chloroform being within the range of from about 1.5:1 to about 5:1.

13. The process of claim 12 wherein said dihalocarbene acceptor contains at least one aliphatic carbon-to-carbon double bond.

14. A process involving the generation of dihalocarbene and the proximate formation of dihalocarbene adducts which comprises the step of reacting together in an essentially anhydrous saturated hydrocarbon solvent an initially essentially anhydrous mixture with the reactants consisting essentially of a solid alkali metal hydroxide, a haloform and a dihalocarbene acceptor, said haloform containing at least one halogen atom selected from the group consisting of chlorine and bromine.

15. A process involving the generation of dihalocarbene and the proximate formation of a dihalocarbene adduct which comprises the step of reacting together in an essentially anhydrous saturated hydrocarbon solvent at a temperature within the range of about 0° C. to about 250° C. an initially essentially anhydrous mixture, the reactants consisting essentially of a solid alkali metal hydroxide, a haloform, and a dihalocarbene acceptor, said haloform containing at least one halogen atom selected from the group consisting of chlorine and bromine and wherein the effect of water generated by the reaction is minimized by charging the reactor with a molar excess of said alkali metal hydroxide over the moles of haloform employed, the molar ratio of alkali metal hydroxide to haloform thus being greater than 1:1.

References Cited by the Examiner

UNITED STATES PATENTS

| 2,950,328 | 8/1960 | Orchin | 260—648 |
| 2,967,181 | 1/1961 | Herrick et al. | 260—648 |

OTHER REFERENCES

Doering et al., "J. Am. Chem. Soc.," vol. 76, pp. 6162–6165 (1954).

Leitich, "Osterreichische Chemiker-Zeitung," vol. 61, pp. 164–172 (1960).

LEON ZITVER, *Primary Examiner.*

K. H. JOHNSON, K. V. ROCKEY,
*Assistant Examiners.*